United States Patent [19]

Arakawa et al.

[11] Patent Number: 4,707,097
[45] Date of Patent: Nov. 17, 1987

[54] FILM FRAME NUMBER DISPLAY DEVICE FOR CAMERA

[75] Inventors: Kazuhiko Arakawa, Tokyo; Yoshihito Harada, Kanagawa; Masayoshi Kiuchi, Kanagawa; Go Tokura, Kanagawa; Kazuo Fujibayashi, Kanagawa, all of Japan

[73] Assignee: Canon Kabushiki Kaisha

[21] Appl. No.: 831,600

[22] Filed: Feb. 21, 1986

[30] Foreign Application Priority Data

Feb. 27, 1985 [JP] Japan .................................. 60-38576
Mar. 1, 1985 [JP] Japan .................................. 60-41402
Jul. 26, 1985 [JP] Japan .................................. 60-166403
Jul. 26, 1985 [JP] Japan .................................. 60-166404

[51] Int. Cl.⁴ .............................................. G03B 1/66
[52] U.S. Cl. .................................................... 354/217
[58] Field of Search ......................................... 354/217

[56] References Cited

U.S. PATENT DOCUMENTS 4,286,849 9/1981 Uchidoi et al. ................. 354/217 X
4,298,257 11/1981 Togo et al. ...................... 354/217 X
4,461,560 7/1984 Yoshimo et al. ............... 354/217 X Primary Examiner—Michael L. Gellner
Attorney, Agent, or Firm—Toren, McGeady & Associates

[57] ABSTRACT

This invention relates to a film frame number display device in which, when the remaining number of film frames is above a prescribed value, the number of frames is displayed in semi-analog form by using a bargraph display, and, when the remaining number of film frames falls below the prescribed value, the number of frames is displayed in numerical form by using a digit display circuit.

15 Claims, 15 Drawing Figures

FIG.6  FIG.7  FIG.8  FIG.9
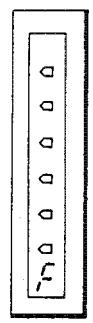 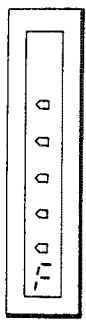 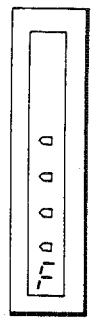 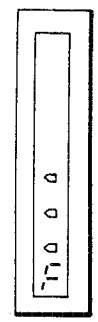
FIG.10  FIG.11  FIG.12  FIG.13  FIG.14
   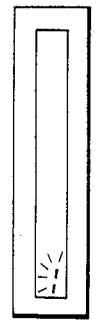 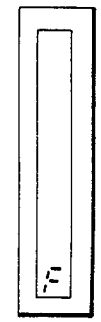

4,707,097

FILM FRAME NUMBER DISPLAY DEVICE FOR CAMERA

BACKGROUND OF THE INVENTION

1. Field of the Invention

This invention relates to display devices for cameras, and more particularly to a device for displaying the number of film frames.

2. Description of the Prior Art

It is known in the art to provide a film frame number display device by using 7-segment display elements. In such a display device, while the number of film frames exposed or to be exposed can be recognized as the number itself very advantageously, there is a drawback that as the displayed numeral changes by each exposure, all the seven segments in each digit appears to be flickering. Particularly, when shooting a continuous series of frames at high speed by using a motor drive device, the above-described flickering tendency is intensified, making the display uncomfortable to view.

To eliminate this problem, instead of the 7-segment, use may be made of so-called dots or bar patterns in a bar graph-like array to display the film frame number. In this method, the number of patterns is necessarily equal to the maximum possible number of film frames. Because of the great number of patterns, however, a difficult problem arises in installing them in a compact display device. Even by this method, when in motorized continuous shooting, as the bars change rapidly one by one, there is produced a drawback that the display movement becomes offensive to the eye.

Meanwhile, the necessity of clearly recognizing the number of frames is not very high when the remaining number of frames is many. It is when it has become few that necessity arises

SUMMARY OF THE INVENTION

An object of the invention is to provide a display device for the number of film frames in which after the remaining number of film frames has fallen below a prescribed value, the number of film frames is displayed in digit form, thereby the above-described problems are eliminated.

Another object of the invention is to provide a display device for displaying the number of film frames in such a manner that each time a prescribed number of film frames have been exposed, the display pattern is caused to change, thereby the problem that the rapid succession of displayed digits appears as if the displayed value were flickering is prevented from occurring when a continuous series of shots are taken.

Still another object of the invention is to provide a display device for displaying the number of film frames in such a manner that when the remaining number of film frames are many, a change of the display of patterns takes place for every prescribed number of film frames exposed, and, after the remaining number of frames falls below a prescribed value, it takes place for every one frame exposed, thereby the aforesaid objects are accomplished.

A further object of the invention is to provide utilization of the display device of displaying a plurality of light values in pattern form as a frame number display device when the light metering mode is changed over from one for measuring the brightnesses of a plurality of portions of the area of the picture frame to another one.

Other objects of the invention will become apparent from the following description of embodiments thereof by reference to the drawings.

BRIEF DESCRIPTION OF THE DRAWINGS

FIGS. 4 to 14 are similar to FIG. 3 except that a variety of operative positions of the display device are illustrated.

DETAILED DESCRIPTION OF THE PREFERRED EMBODIMENT

Figure 1:
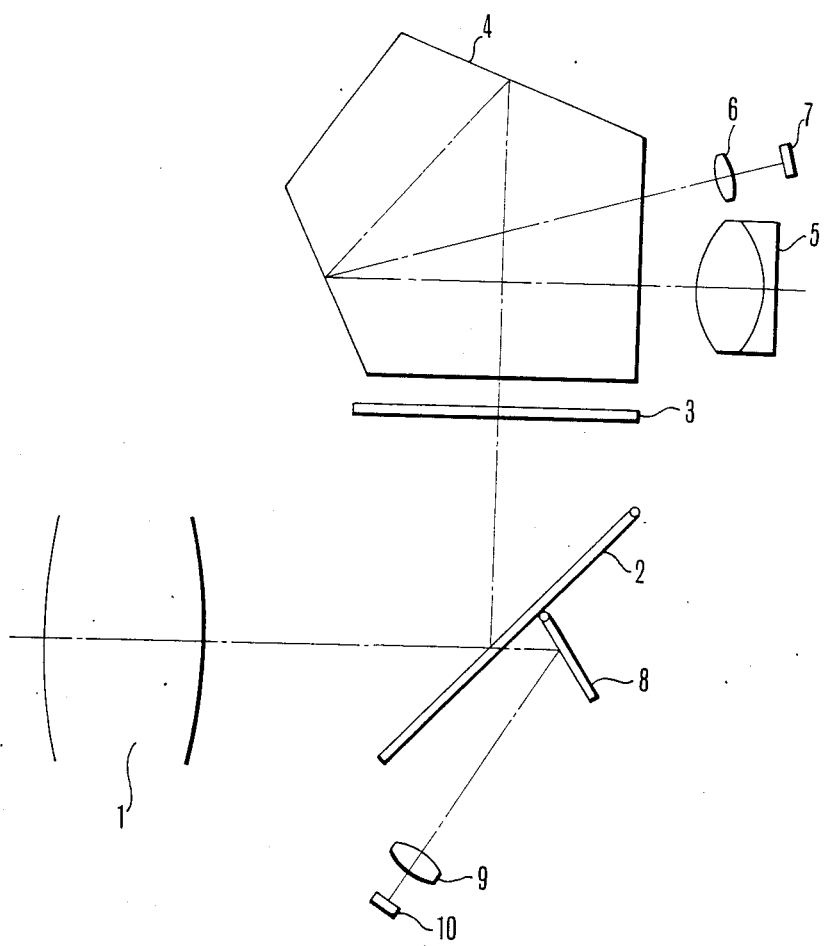
FIG. 1 is a schematic sectional view of an optical system of a camera employing the display device of the invention.

The present invention is next described in connection with an embodiment thereof in detail. In FIG. 1 there are shown two light metering arrangements with which the display device of the invention is associated. A finder optical system comprises a half-reflection main mirror 2 normally inclined 45° with respect to an optical axis of a photographic lens 1, a focusing screen 3, a roof type pentagonal prism 4 and an eyepiece 5. For an average light metering aspect, there are a collection lens 6 and a photosensitive element 7. To a spot metering aspect, a total-reflection sub-mirror 8, a lens system 9 and a photosensitive element 10 are used. Light from an object to be photographed enters through the lens 1 and is reflected by the main mirror 2 to the focusing screen 3 on which an image of the object is formed. This finder image is used in average light metering by the photosensitive element 7 through the collection lens 6.

The light beam on the main mirror 2 partly passes to the sub-mirror 8 therethrough and therefrom is reflected to the lens system 9 by which the part of the light beam is condensed before it impinges on the photosensitive element 10. Thus, the element 10 is responsive to such light as comes from a narrow region of the field of view or a portion of the area of the picture frame, for spot-metering is performed. Therefore, the camera has the selection of the average-metering and spot-metering modes by switch means operable to couple either the photosensitive element 7 or 10 to an exposure value indicating means to be described below.

Figure 2:
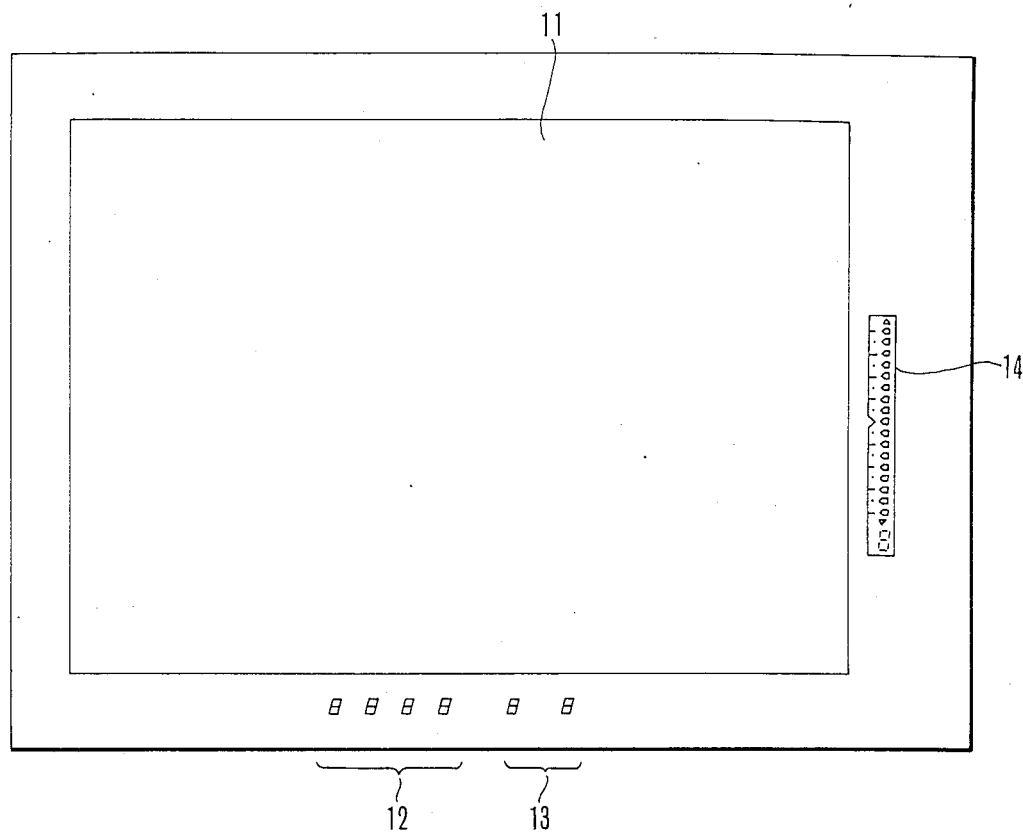
FIG. 2 is a plan view of an arrangement of the display device of the invention within a finder of the camera.

FIG. 2 illustrates the displays presented within the field of view of the finder of the camera. 11 is a finder image frame. 12 and 13 are 7-segment display devices for shutter speed and aperture value, respectively formed, in this embodiment, by LEDs. These LED devices constitute the exposure value indicating means described above.

14 is a bar graph pattern and 7-segment pattern display portion for displaying the spot light-value and the remaining amount of film in respective modes formed in this embodiment by a liquid crystal display device.

Figure 3:
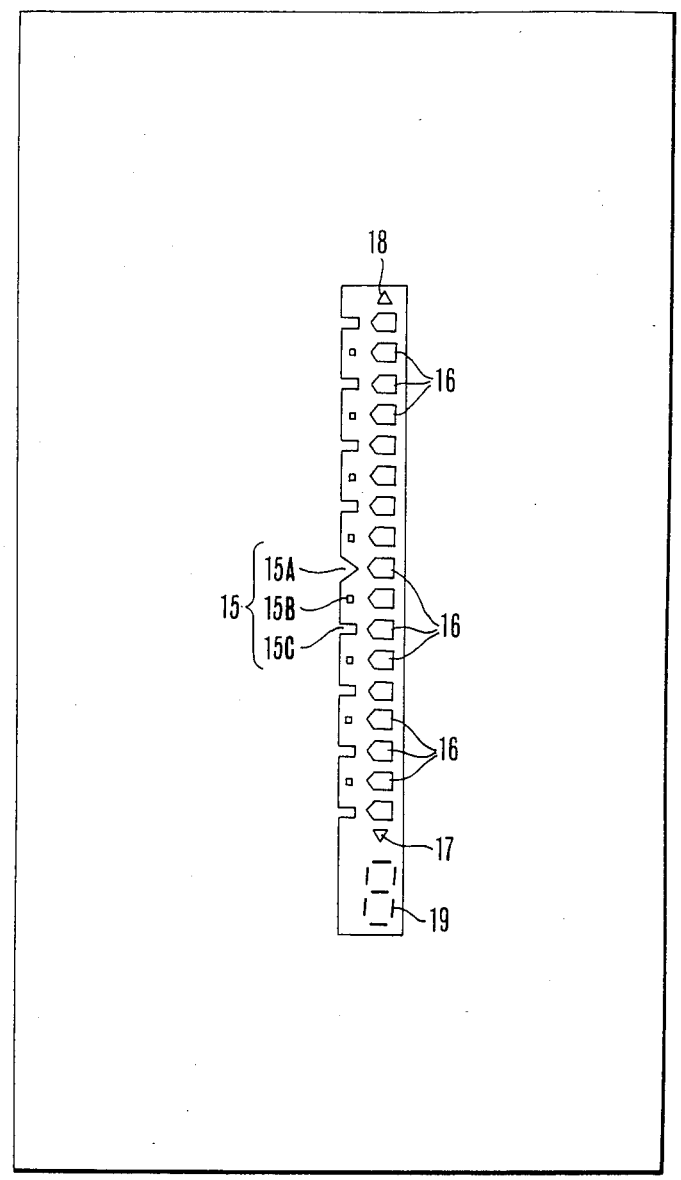
FIG. 3 is an elevational view of an embodiment of the display device according to the invention.

FIG. 3 illustrates the details of the display pattern of the display portion 14 of FIG. 2. 15 is a scale display pattern for indicating what discrepancy lies between the light value obtained by the spot metering aspect and the exposure control value (the exposure value to be determined by the controlled shutter time and aperture value). In the pattern 15, calibrations 15A, 15B and 15C represent null, $\frac{1}{2}$ unity of light value, and one unity of light value, respectively. Bar patterns 16 display either the spot light value or the remaining amount of film in the respective modes. 17 and 18 are respectively under and over warning patterns for displaying that the light value falls outside the respective limits of an indicatable range. 19 is a 7-segment pattern. As the film is in the wound-up position, and an exposure is readied, the pattern 19 takes a certain particular shape, in this embodiment, "F". When the remaining number of film frames is fewer than a prescribed value, in this embodiment, nine, it is displayed in digital form.

In the following, the display portion 14 of FIG. 2 will be explained in connection with each mode.

Figure 4:
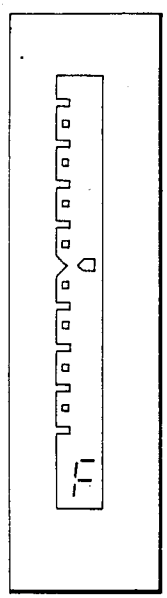
Figure 5:
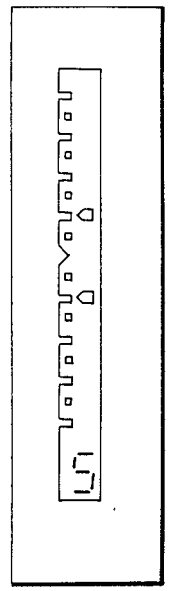

At first, explanation is given to the spot light metering mode. When in the spot light metering mode, the display portion 14 (liquid crystal display device) of FIG. 2 presents a display of the scale pattern 15 of FIG. 3. In this state, an operating member is actuated to perform the spot metering so that the bar patterns 16 in the opposed positions to the calibrations 15A, 15B, 15C of FIG. 3 are displayed as shown in FIG. 4. That is, for the first time of spot light metering, since, before that, no light value has been memorized in the camera, the spot light value becomes a standard value and the pattern which is in registry with the null position 15A of the scale appears. With this state, when the operating member is actuated again to obtain a second spot light value, the camera computes a mean value of the first and second light values. Then, the bar pattern display is changed so as to put this mean value in opposition to the calibration 15A at the center of length of the scale of FIG. 3. That is, if the second spot light value is lower in brightness by, for example, two units than the first spot light value, a corresponding bar pattern to the first spot light value is displayed at a position shifted one step upward from the position of the calibration 15A as the center, and another bar pattern which corresponds to the second spot light value is displayed at a position shifted one step downward from the calibration 15A. Then, if actuation of the operating member is repeated to obtain three or more spot light values, a mean value of all the light values shifts to the opposite position to the calibration 15A, while an equal number of patterns to the number of light values appear at respective positions corresponding to the brightness differences between the light values and the mean value. Also, in case a plurality of cycles of light metering operation have been performed as has been described above, if the brightness difference between the spot light value obtained in a certain one of the cycles and the mean value is larger than the indicatable range (in this instance, ±4 units), the under or over warning pattern 17 or 18 is lighted, warning the photographer of the fact that besides the light values indicated by the displayed patterns there is an additional light value beyond the range. It should be noted that the 7-segment pattern 19 of FIG. 3 is, as has been described above, a display pattern for film information. So when the film cartridge is inserted, the winding operation is completed, and an exposure is possible to make, a particular pattern, in this instance, "F" for "film", is displayed, informing the photographer that the film is loaded in the camera. Also, as shootings go on, when the remaining number of film frames becomes fewer than a prescribed value (in this instance, 9 frames), the "F" display is changed to a digital display as shown in FIG. 5. As the remaining number of film frames decreases from 9, the displayed digit changes its value as "9", "8", and so on each time an exposure is made, warning the photographer of the remaining number of film frames.

Next explanation is given to another case when in the average light metering mode. When in the average light metering mode, the pattern display portion 14 of FIG. 2 is solely used for displaying the film information, and the light value is inhibited from being displayed. That is, in this mode, the scale display pattern 15 of FIG. 3 and the under and over warning patterns 17 and 18 of FIG. 3 are not displayed, but the display in the display portion 14 is changed over to film information display. In this film information display, the remaining amount of film is displayed in semi-analog form by the bar patterns 16 of FIG. 3. Thus consideration has been made that how many more film frames are left can be grasped in a short time. That is, in the embodiment, every six of the film frames are indicated by one bar pattern. In case when a film of 36 or more exposures is loaded, therefore, 6 bar patterns in every third bars are lighted as shown in FIG. 6, indicating that the remaining number of film frames is more than 36. As the number of exposed film frames increases, for 35 to 30 frames left not exposed, 5 bar patterns appears as shown in FIG. 7; for 29 to 24 frames, 4 bar patterns as shown in FIG. 8; for 23 to 18 frames, 3 bar patterns as shown in FIG. 9; and for 17 to 12 frames, 2 bar patterns as shown in FIG. 10. In other words, the six bar patterns disappear one by one for every six exposures. Here assuming that the maximum number of film frames available in the loaded cartridge is 24 or 12, then the display of the bar patterns begins with lighting of four or two patterns, respectively. Then, for every six exposures, one of them disappears. Also, when the remaining number of film frames is either 11 or 10, only one bar pattern is lighted as shown in FIG. 11. Then, when the remaining number of film frames is 9 or fewer, the display of the remaining number of frames changes from the semi-analog form of bar patterns to a digital form of 7-segment as shown in FIG. 12. After that, therefore, in a similar manner to that when in the spot light metering mode, the remaining number of frames is displayed by a corresponding digit.

Figure 15:
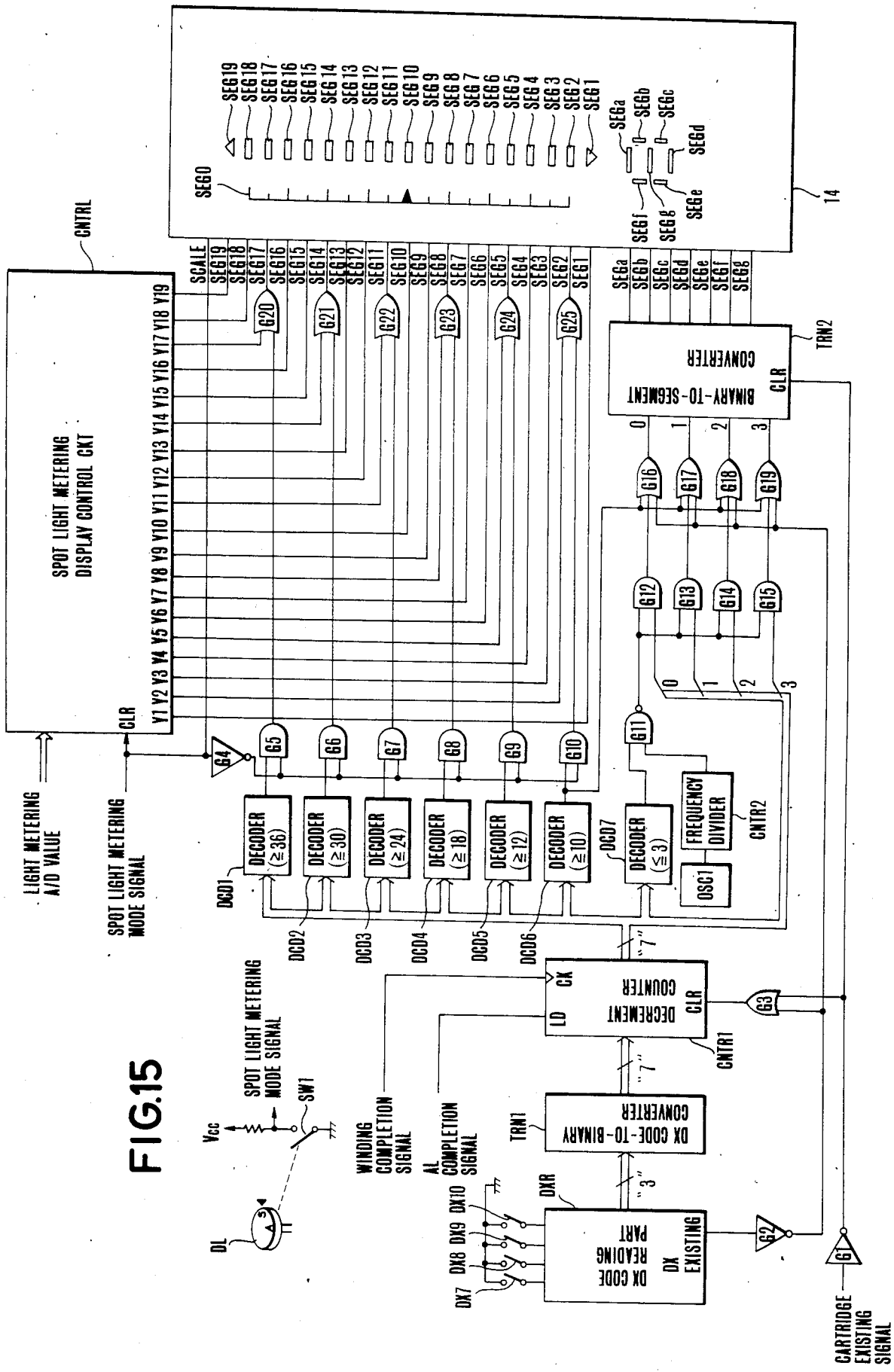
FIG. 15 is an electrical circuit diagram of a control circuit for the display device of the invention.

FIG. 15 is an electrical circuit diagram illustrating a practical example of a display control circuit for controlling the operation of the display portion 14 of FIG. 3.

The display portion within a block 14 comprises segment patterns SEG0 constituting the scale display pattern 15 for use in the spot metering mode shown in FIG. 3, segments SEG1 to SEG19 constituting the bar pattern 16 and warning patterns 17 and 18, and segments SEGa to SEGg constituting the 7-segment pattern 19. This display portion 14 lights when at least one of the input signals SCALE, SEG1-SEG19 and SEGa-SEGg is high.

A spot light value display control circuit CNTRL, receptive in the spot light metering mode of an A-to-D converted value of the spot metering obtained each time the aforesaid operating member is actuated and a spot light metering mode signal (high level) formed when the spot light metering mode is selected by a mode changeover means, seeks the deviation of each spot light value from the mean value of all the spot light values and produces outputs at prescribed terminals Y1 to Y19.

That is, this control circuit CNTRL computes a mean value ($\overline{EV}$) from a plurality of cycles of spot light metering operation and then the deviation of each of the light values (EV1-EVn) from the mean value ($\overline{EV}$), or the differences ($\overline{EV}$−EV1, to $\overline{EV}$−EVn). When this difference is zero, it produces an output at the terminal Y10, causing the segment SEG10 to light on. And, when the aforesaid difference increases or decreases in 0.5 units, the output is produced at the corresponding one of the terminals Y11 to Y19 and Y9 to Y1, respectively, causing the segments SEG11 to SEG19 and SEG9 to SEG1 to light on. As this circuit, use may be made of that shown in Japanese Laid-Open Patent Application No. SHO 59-246736. It should be noted that, said control circuit CNTRL renders all the outputs at the output terminals Y1 to Y19 low when the spot light metering mode signal is low level, thereby the aforesaid difference display is inhibited.

DX7-DX10 are switches for reading the film frame number information described in the form of a code on the film cartridge or the so-called DX film cartridge when inserted into a chamber therefor in the camera. Of these switches, DX8 to DX10 are assigned to read the code which represents the film frame number, and DX7 is a switch for detecting whether or not the film inserted in the cartridge chamber is of the DX type. DXR is a reader connected to the aforesaid detecting switches DX7 to DX10 to produce an output which is sent to a code converter TRN1 for converting the frame number code detected by the aforesaid switches DX8 to DX10 to a binary code and another output representing the detected result of the switch DX7 which is sent to an inverter G2.

CNTR1 is a decrement counter having data input terminals connected to the outputs of the aforesaid code converter TRN1. When an automatic loading of the film by a film loading circuit known in the art terminates, the loading circuit produces an output representing the completion of automatic loading. Responsive to this signal, the decrement counter CNTR1 receives the output of the converter TRN1. Also, said counter CNTR1 performs a minus one count in response to winding-up completion signal from a film winding up circuit each time the film has advanced one frame.

G3 is an OR gate connected to the aforesaid inverters G2 and G1. When the output of the inverter G2 is high level, that is, when the DX-present output of the circuit DXR has changed to low level, indicating that film not of the DX type has been detected by the switch DX7, and when the output of the inverter G1 is high level, that is, when the cartridge-present signal has changed to low level, indicating that no film cartridge is present in the cartridge chamber, the OR gate G3 passes a high level to the clear terminal CLR of the counter CNTR1, thereby clearing the counter CNTR1. Decoders DCD1 to DCD7, for decoding the content of the aforesaid counter CNTR1 detect respectively, whether or not the content of the counter CNTR1 is 36 or more, 30 or more, 24 or more, 18 or more, 12 or more, 10 or more, or 3 or less, and produce outputs of high level when the content of the counter CNTR1 takes the aforesaid condition.

G5 to G10 are AND gates; G20 to G25 are OR gates; G4 is an inverter. These elements constitute a data selector for changing over the input state to the display portion 14.

G12 to G15 are AND gates each having two inputs, one of which receives a last 4-bit signal out of the output (7-bit signal) of the aforesaid counter CNTR1, and the other of which receives the output of a NAND gate G11. G16 to G19 are OR gates having three inputs, two of which are connected to the output of the aforesaid decoder DCD6 and the output of the inverter G2, respectively, and the other input of which is connected to the respective one of the outputs of the AND gates G12 to G15.

TRN2 is a segment converter for converting the input binary code signal to a 7-segment drive signal. When the input signal is (0,0,0,0), the converter TRN2 produces output signals SEGa to SEGg of low level, hindering the display. When the input signal is (1,1,1,1), the output signals SEGa, SEGf, SEGg and SEGe are changed to high level, causing "F" to be displayed.

OSC1 is a pulse oscillator; CNTR2 is a frequency divider for dividing the frequency of pulses from the oscillator OSC1. When the remaining number of film frames becomes fewer than three, the output is applied through the NAND gate G11 to the AND gates G12 to G15, thereby the segment pattern 19 is made blink, warning that the number of film frames left is few.

It should be noted that, the set mode is selected by a dial DL. When a mark "S" on the dial DL is registered with an index, the switch SW1 turns off to send a spot light metering mode signal. When another mark "A" is registered with the index, the switch SW1 turns on and the spot light metering mode signal disappears.

Next described is the operation of the embodiment of FIG. 15. At first let us explain in connection with the spot light metering mode. In this case, because the spot light metering mode is selected by an operating member (not shown), the spot light metering mode signal (high level) enters, transmitting to the segment SEG0. This segment SEG0 lights, displaying the scale display pattern 15, and the AND gates G5 to G10 become low level. Meanwhile, the display control circuit CNTRL is rendered operative in response to entrance of the spot light metering mode signal. Therefore, the control circuit CNTRL derives the deviation of each spot light value from the mean value, producing an output signal of high level at the one of the output terminals Y1 to Y19 which is selected in steps of 0.5 units depending upon the value of the deviation. Then the corresponding ones of the segments SEG19 to SEG1 to the respective spot light values are lighted, indicating their differences from the mean value at the null position.

That is, assuming that the spot light metering is recycled two times, and the respective spot light values are EV=1 and EV=3, then the mean value is (1+3)/2=2. Therefore, the deviation of the first and second light values from the mean value are −1 unit and +1 unit respectively, causing the outputs Y8 and Y12 of the control circuit CNTRL to produce high level. So, the segments SEG8 and SEG12 light, displaying that, as shown in FIG. 5, each of the spot light values lies above or below the means value by one step.

Also, assuming that the DX film cartridge is inserted in the cartridge chamber, the frame number information is given to the counter CNTRL. As the number of frames exposed increases, when the winding up operation terminates, the frame number is counted down by that number of frames exposed. Thus, the content of the counter CNTR1 represents the remaining number of film frames. So long as the remaining number of film frames is ≧10, the decoder DCD6 produces an output of high level, and the OR gates G16 to G19 also produce outputs of high level. Therefore, the 7-segment pattern 19 presents the display of "F", indicating that the remaining number of film frames is more than ten. Also, when the remaining number of film frames is in a range of 9 to 4, the OR gates G16 to G19 are supplied with the output of the counter CNTR1 through the AND gates G12 to G15 in place of the output (high level) of the decoder DCD6, so that the remaining number of film frames is displayed in digit form by the 7-segment pattern 19. Also, when the remaining number of film frames further decreases to three or less, because the decoder DCD7 produces an output of high level, the output of the frequency divider CNTR2 is passed through the NAND gate G11 to the AND gates G12 to G15. As a result, the 7-segment pattern 19 while presenting the display of a corresponding digit, is caused to blink in synchronism with the output of the frequency divider CNTR2. It should be noted that, when the content of the counter CNTR1 becomes zero, the 7-segment pattern 19 is hindered from presenting any display, indicating to the photographer that no more frames are available from the cartridge.

Next explanation is given to the average light metering mode. Since, in this case, the spot light metering mode signal is low level, the control circuit CNTRL is cleared, and all the outputs Y1 to Y19 are low level.

Meanwhile, the inverter G4 produces an output of high level, thereby the AND gates G5 to G10 are rendered operative. Therefore, since, in the case of the DX film of 36 or more exposures, the decoders DCD1 to DCD6 all produce outputs of high level, the segments SEG17, SEG14, SEG11, SEG8, SEG5 and SEG2 light, displaying that as shown in FIG. 6 the bar pattern represents that the remaining number of film frames is 36 or more. It should be noted that, since, in this case, the segment SEG0 does not light, the display of the scale pattern is hindered from appearing.

After that, similarly to the above-described spot light metering mode, the content of the counter CNTR1 decreases one count for every one exposure. For 35 to 30 frames left unexposed, SEG14, SEG11, SEG8, SEG5 and SEG2 light, displaying it as shown in FIG. 7. For 29 to 24 frames, SEG11, SEG8, SEG5 and SEG2 light, as shown in FIG. 8. For 23 to 18 frames, SEG8, SEG5 and SEG2 light, as shown in FIG. 9. For 17 to 12 frames, SEG5 and SEG2 light, as shown in FIG. 10. For 11 and 10 frames, SEG2 lights, as shown in FIG. 11.

Also, when the remaining number of film frames further decreases, all the decoders DCD1 to DCD6 produce outputs of low level, prohibiting the bar pattern 16 to present any display, and substituting for it a display of a digit equal to the number of unexposed film frames by the 7-segment pattern which has up until now displayed "F", as L shown in FIG. 12 Then when that number reaches 3 or less, the display of the digit is changed to a blinking form as shown in FIG. 13. Further when that number then becomes zero, all the displays are hindered. Also, in case when the film used is not of the DX type, because the output of the inverter G2 is high level, the 7-segment pattern 19 displays "F" as shown in FIG. 14, and the counter CNTR1 is cleared, prohibiting the display by the bar pattern even when in the average light metering mode.

Also, when no film is loaded, because the output of the inverter G1 becomes high level, the converter TRN2 is in cleared state, prohibiting the display of the 7-segment pattern 19, and the counter CNTR1 also is cleared, prohibiting the display of the bar pattern also even in the average light metering mode. In such a case, nothing is displayed in the display portion 14 at all.

It should be noted that, though in the embodiment the remaining number of film frames is displayed by one bar pattern for every six frames, as it is considered that film sold in the market generally have 12, 24, 36, or multiples of 6, for the change of the displayed form by every 6 frames contributes to easiness in recognizing the frame number, it is to be understood that this number is not confined to 6 as a matter of course.

Also, further, though in the embodiment a corresponding number of bar segments to the remaining frame number are made light, it is also possible, instead of it, to light only one bar segment but in a corresponding different position to the remaining frame number. As the display device, use may be made of 7-segment type.

Also, though in the embodiment the number of frames to be exposed is displayed, instead of it, a number of frames exposed may be displayed. For this purpose, the film frame circuit may be otherwise constructed in such a manner that instead of the decrement counter, an increment counter is used so that the film frame number read out by the DX code reader is subtracted by the content of that counter. When the difference reaches a prescribed value, the content of the counter is given to the digit display device.

It should be noted that, though in the embodiment the discrimination between whether the bar pattern display of the display portion 14 indicates the remaining number of film frames, or the spot light values is made by using the presence or absence of the scale pattern, another different display pattern may be provided for allowing the bar pattern display of the display portion 14 to indicate either the remaining number or the light value. Also, through in the embodiment the spot light value display is performed by the relative value display, it is also possible, instead, to display the absolute values of the spot light by the bar display.

As has been described above, according to the present invention, each time a prescribed number of film frames are used up, the display value is changed, and after the remaining number falls below the prescribed value, for every one frame, the frame number change is displayed, thereby giving an advantage that the flickering of the display value is prevented from occurring when the photographer is informed of the film frame number.

Also, in the present invention, the display device for displaying the multiple-point light values in the form of bar patterns is made to serve as a film frame information display device when in modes other than the multiple-point light metering mode. In the case of other than the exposures which require sufficient attention to the making of a picture by performing the spot metering in many portions of the area of the picture frame, shots can be made while viewing the film frame number information within the finder. In the average light metering mode suited to continuous shooting of a moving object, it becomes possible to pay attention to the frame number when running the camera.

Therefore, according to the present invention, for the multiple-point light metering mode, all the light values can be displayed, and for the average light metering mode in which continuous shooting often happens, the film frame information can be displayed within the finder, thereby a drawback that a shutter chance is missed without being aware of the film end can be eliminated.

What is claimed is:

1. A film frame number display device for a still camera comprising:
   (a) a first display circuit for displaying film frame number information in numeral form;
   (b) a second display circuit having a plurality of pattern portions to display the film frame number information in a different form from said numeral form; and
   (c) a prohibiting circuit for prohibiting display of film frame number information by said first display circuit when the film frame number information does not satisfy the condition that the frame number information $\leq 9$ frames, whereby said first display circuit is a one-digit display circuit.

2. A film frame number display device for a still camera comprising:
   (a) a first display circuit for displaying film frame number information in numeral form;
   (b) a second display circuit having a plurality of pattern portions to display the film frame number information in a different form from said numeral form; and
   (c) a prohibiting circuit for prohibiting the display of film frame number information by said first display circuit until the film frame number information becomes a state of representing a prescribed frame number.

3. A film frame number display device for a still camera comprising:
   (a) a first display circuit for displaying film frame number information in numeral form;
   (b) a second display circuit having a plurality of pattern portions to display the film frame number information in a different form from said numeral form; and
   (c) a control circuit for causing said first display circuit to display frame number information when the film frame number information represents a prescribed range of frame numbers, and said second display circuit to display frame number information when the frame number information represents a frame number in a different range from said prescribed range of frame numbers.

4. A film frame number display device for a still camera having at least a first exposure mode and a different second exposure mode from said first exposure mode, comprising:
   (a) a display circuit; and
   (b) a control circuit for prohibiting the display of the film frame number information by said display circuit when the exposure mode of said camera is the first mode, and for causing said display circuit to display said film frame number information when the exposure mode of said camera is the second mode.

5. A film frame number display device for a still camera, comprising:
   (a) a film frame number informaition forming circuit for producing a film frame number information;
   (b) a display circuit for displaying a frame number based on said frame number information, said circuit having a first mode in which a frame number in a prescribed range of frame numbers is displayed, and a second mode in which a particular frame number region within said prescribed frame number range is displayed; and
   (c) selecting means for selecting the first and second modes of said display circuit.

6. A device according to claim 5, wherein said selecting means selects either one of the first and second modes depending on the set state of the camera.

7. A device according to claim 5, wherein said selecting means selects either one of the first and second modes in response to selection of the light metering modes of the camera.

8. A film frame number display device for a camera, comprising:
   (a) film counter means for renewing a frame number information value every time a frame of film is photographed;
   (b) a display circuit for making a frame number display by varying a display state corresponding to the frame number information value by said film counter means; and
   (c) a control circuit for detecting the frame number information value of said film counter means and prohibiting said frame number display, which is made by said display circuit as it shows such state as corresponding to the frame number information value, until said frame number information value becomes an information value reflecting a first value in a process of renewing the information value as photographings proceed, then after said information value reflecting the first value is attained, allowing said frame number display as a state corresponding to the frame number information value is attained.

9. A device according to claim 8, wherein said display circuit displays a specific fixed state until the frame number information value of said counter means reaches the information value reflecting said first value, then after the information value reflecting the first value is attained, makes a display under such state as corresponding to the frame number information.

10. A device according to claim 8, wherein said display circuit consists of a numeral display circuit of one digit and displays remaining number of film frames with numerals.

11. A film frame number display device for a camera, comprising:
    (a) film counter means for renewing a frame number information value every time a frame of film is photographed;
    (b) a plurality of display elements arranged in a row; and
    (c) a display element driving circuit for varying a display state by said plurality of display elements every time the frame number information value of said counter means varies by a prescribed frame number of at least two frames or more.

12. A device according to claim 11, wherein said driving circuit shifts said plurality of display elements arranged in a row to a non-displaying state one by one, from the element positioned at one end of the row, every time the frame number information value changes by said prescribed number of frames.

13. A device according to claim 12, wherein said prescribed number of frames corresponds to 6 frames.

14. A device according to claim 11, wherein said prescribed number of frames corresponds to 6 frames.

15. A film frame number display device for a camera having at least a first light metering mode and a second light metering mode being different from said first mode, comprising:
    (a) a film frame number information forming circuit for forming a film frame number information;

(b) a light metering information forming circuit for forming such information as corresponding to a light metering output;
(c) a display circuit; and
(d) selecting means for selecting the frame number information from said frame number information forming circuit when said mode is the first light metering mode and transmitting the same to said display circuit, and selecting the information from said light metering information forming circuit when the mode is said second mode and transmitting the same to said display circuit.

* * * * *